United States Patent [19]
Ozaki

[11] Patent Number: 5,597,366
[45] Date of Patent: Jan. 28, 1997

[54] BICYCLE REAR DERAILLEUR

[76] Inventor: Nobuo Ozaki, 1-4-14 Kohama, Suminoe-ku, Osaka, Japan

[21] Appl. No.: 349,819

[22] Filed: Dec. 6, 1994

[30] Foreign Application Priority Data

Dec. 6, 1993 [JP] Japan .................... 5-343775

[51] Int. Cl.⁶ .................................... F16H 9/00
[52] U.S. Cl. .................................... 474/82
[58] Field of Search .................... 474/82, 78, 80

[56] References Cited

U.S. PATENT DOCUMENTS

| | | | |
|---|---|---|---|
| 3,974,707 | 8/1976 | Nagano | 474/82 |
| 4,183,255 | 1/1980 | Leiter. | |
| 4,226,132 | 10/1980 | Nagano et al. | 474/82 |
| 4,348,198 | 9/1982 | Shimano | 474/82 |
| 4,403,978 | 9/1983 | Huret | 474/82 |
| 4,437,848 | 3/1984 | Shimano | 474/82 |
| 4,575,365 | 3/1986 | Nagano | 474/82 X |
| 4,610,644 | 9/1986 | Nagano | 474/82 |
| 4,618,332 | 10/1986 | Nagano | 474/82 X |
| 4,619,632 | 10/1986 | Nagano | 474/82 X |
| 4,692,131 | 9/1987 | Nagano | 474/82 X |
| 4,731,045 | 3/1988 | Nagano | 474/82 X |
| 4,755,162 | 7/1988 | Nagano | 474/82 |
| 4,789,379 | 12/1988 | Ozaki et al. | 474/82 |
| 4,832,662 | 5/1989 | Nagano | 474/82 X |
| 4,895,553 | 1/1990 | Nagano | 474/82 X |
| 5,213,549 | 5/1993 | Blanchard | 474/82 X |
| 5,238,458 | 8/1993 | Ishibashi | 474/82 |

FOREIGN PATENT DOCUMENTS

| | | |
|---|---|---|
| 2543639 | 10/1984 | France. |
| 93/18958 | 6/1993 | WIPO. |

*Primary Examiner*—Roger J. Schoeppel
*Attorney, Agent, or Firm*—Merchant, Gould, Smith, Edell, Welter & Schmidt

[57] ABSTRACT

A bicycle rear derailleur is provided for shifting a chain from one sprocket to another of a multiple freewheel which includes a plurality of sprockets each having a lowermost edge portion. The derailleur comprises a control mechanism pivotally mounted to a bicycle frame by a first pivot shaft which is parallel to the hub shaft, and a chain guide pivotally mounted to the control mechanism by a second pivot shaft which is parallel to the hub shaft. The chain guide rotatably supports an upper guide wheel and a lower tension wheel. The chain guide is biased in a chain tensioning direction by a spring and controlled by the control mechanism to move axially of the hub shaft. The guide wheel has an uppermost edge portion located ahead of the lowermost edge portion of each sprocket which the chain engages. The control mechanism is freely pivotable about the first pivot shaft without any spring bias at least within a predetermined range.

8 Claims, 4 Drawing Sheets

BICYCLE REAR DERAILLEUR

BACKGROUND OF THE INVENTION

1. Field of the Invention

The present invention relates to a bicycle rear derailleur for shifting a chain from one sprocket to another of a multiple freewheel.

2. Description of the Background Art

As is well known, a bicycle rear derailleur is provided adjacent to a freewheel for shifting a chain from one sprocket to another sprocket of the freewheel. A typical prior art rear derailleur is disclosed in U.S. Pat. No. 4,610,644 for example.

Specifically, the prior art derailleur of the above U.S. patent comprises a chain guide and a pantograph linkage assembly for moving the chain guide axially of the rear hub shaft on which the multiple freewheel is rotatably mounted. The chain guide rotatably supports an upper guide wheel and a lower tension wheel. The pantograph linkage assembly comprises a base member pivotally mounted to a rear fork end of the bicycle frame by a first pivot shaft, inner and outer links having their respective base ends pivotally connected to the base member by first and second pins, and a movable member pivotally connected to the respective free ends of the inner and outer links by third and fourth pins. The movable member pivotally supports the chain guide by a second pivot shaft. The first to fourth pins are located at the four corners of a parallelogram.

The base member of the pantograph linkage assembly is pivotally biased rearward by a first coil spring mounted on the first pivot shaft. Similarly, the chain guide is pivotally biased rearward by a second coil spring mounted on the second pivot shaft. Thus, the chain in engagement with the guide and tension wheels of the chain guide is tensioned by the first and second coil springs. The derailleur incorporating the two chain tensioning springs is said to have a double-tension mechanism.

Further, each of the first to fourth pins of the pantograph linkage assembly is inclined so that its lower end is located laterally outwardly from its inner end. As a result, when the pantograph linkage assembly is deformed to move the chain guide laterally inward, the chain guide also moves downwardly. Due to the inclination or slanting of the pins, the pantograph linkage assembly is referred to as a "slant pantograph linkage assembly".

The prior art derailleur having the slant pantograph linkage assembly and the double tension mechanism has been found to work well with respect to a certain range of freewheels if the first and second coil springs are properly adjusted in their respective spring force. However, the prior art derailleur is still disadvantageous in the following points.

Since the sprockets of the freewheel diametrically increase inward axially of the hub shaft (i.e., the freewheel), the guide wheel of the chain guide need to move downward as it moves inward axially of the hub shaft. On the other hand, the chain tension progressively increases as the chain shifts to a diametrically larger sprocket of the freewheel, so that the chain tension tends to pivotally move the entirety of the derailleur (including the guide wheel) upward about the first pivot shaft against the first coil spring. Thus, due to the increasing chain tension, the guide wheel may actually move upward toward a diametrically larger sprocket despite the fact that the slant pantograph mechanism itself tends to move the guide wheel downward toward a diametrically larger sprocket of the freewheel. As a result, the prior art derailleur may fail to properly shift the chain from a smaller sprocket to a larger sprocket. This disadvantage will be particularly remarkable when a diametrical difference between the largest and smallest sprockets is large.

The above disadvantage itself may be overcome by increasing the elastic force of the first coil spring. However, this solution gives rise to a new disadvantage that the guide wheel becomes excessively far from a diametrically smaller sprocket (due to forcible rearward pivoting of the base member under the strong elastic force of the first coil spring) when the chain shifts thereto from a diametrically larger sprocket. Further, if the first coil spring is made to have an increased elastic force, the chain tension will inevitably increase, consequently hindering smooth shifting of the chain.

Moreover, the double tension mechanism is also disadvantageous in that the elastic forces of the two coil springs must be adjusted in relation to each other for providing a good chain shifting performance with respect to every particular freewheel.

SUMMARY OF THE INVENTION

It is, therefore, an object of the present invention to provide a bicycle rear derailleur which is capable of additionally improving the chain shifting performance.

According to one aspect of the present invention, there is provided a bicycle rear derailleur for shifting a chain from one sprocket to another of a multiple freewheel which includes a plurality of sprockets, the sprockets diametrically increasing inward axially of a hub shaft, each of the sprockets having a lowermost edge portion, the derailleur comprising: a control mechanism pivotally mounted to a rear fork end of a bicycle frame by a first pivot shaft which is parallel to the hub shaft; and a chain guide pivotally mounted to the control mechanism by a second pivot shaft which is parallel to the hub shaft, the chain guide rotataby supporting an upper guide wheel and a lower tension wheel, the chain guide being biased in a chain tensioning direction by a spring, the chain guide being controlled by the control mechanism to move axially of the hub shaft, the guide wheel having an uppermost edge portion located ahead of the lowermost edge portion of each sprocket which the chain engages; the control mechanism being constructed and arranged to move the upper guide wheel of the chain guide downwardly and forwardly when the upper guide wheel is moved inward axially of the hub shaft.

Preferably, the uppermost edge portion of the guide wheel is located above the lowermost edge portion of said each sprocket which the chain engages. In this case, a portion of the chain leaving the guide wheel for engagement with said each sprocket extends rearwardly downward.

The specific structure of the control mechanism is not limitative. However, the control mechanism may comprise a pantograph linkage assembly which includes: a base member pivotally connected to the first pivot shaft; inner and outer links having respective base ends pivotally connected to the base member by first and second pins; and a movable member pivotally connected to respective free ends of the inner and outer links by third and fourth pins, the movable member carrying the second pivot shaft; wherein the first to fourth pins are located at four corners of a parallelogram.

According to a preferred embodiment of the present invention, the first pivot shaft is mounted on a rear fork end of the bicycle frame. Further, the base member has an upper end pivotally connected to the first pivot shaft and extends downwardly to provide a lower end below the freewheel, the base ends of the inner and outer links being pivotally connected to the lower end of the base member by the first and second pins, the inner and outer links extending upward from the lower end of the base member, whereby when the pantograph linkage assembly is deformed to move the chain guide inward axially of the hub shaft, the chain guide also moves downward.

It is further advantageous if each of the first to fourth pins has a forward end and a rearward end, wherein said each of the first to fourth pins is inclined so that the forward end is located laterally outwardly from the rearward end, whereby when the pantograph linkage assembly is deformed to move the chain guide inward axially of the hub shaft, the chain guide also moves forwardly downward. It is also advantageous if the guide wheel of the chain guide is supported to rotate about the second pivot shaft.

According to another aspect of the present invention, there is provided a bicycle rear derailleur for shifting a chain from one sprocket to another of a multiple freewheel which includes a plurality of sprockets, the sprockets diametrically increasing inward axially of a hub shaft, the derailleur comprising: a pantograph linkage assembly including a base member pivotally connected to a rear fork end of a bicycle frame by a first pivot shaft, inner and outer links having respective base ends pivotally connected to the base member by first and second pins, and a movable member pivotally connected to respective free ends of the inner and outer links by third and fourth pins, the first to fourth pins being located at four corners of a parallelogram; and a chain guide pivotally mounted to the movable member of the pantograph linkage assembly by a second pivot shaft which is parallel to the hub shaft, the chain guide rotataby supporting an upper guide wheel and a lower tension wheel, the chain guide being biased in a chain tensioning direction by a spring; wherein the base member has an upper end pivotally connected to the first pivot shaft and extends downwardly to provide a lower end below the freewheel, the base ends of the inner and outer links being pivotally connected to the lower end of the base member by the first and second pins, the inner and outer links extending upward from the lower end of the base member; wherein each of the first to fourth pins has a forward end and a rearward end, said each of the first to fourth pins being inclined so that the forward end is located laterally outwardly from the rearward end; the pantograph linkage assembly being constructed and arranged to move the guide wheel of the chain guide downwardly and forwardly when the upper guide wheel is moved inward axially of the hub shaft.

Typically, the first pivot shaft may be mounted on a rear fork end of the bicycle frame. Further, first pivot shaft may be mounted on the rear fork end of the bicycle frame by a mount bracket extending downwardly from the rear fork end.

Other object, features and advantages of the present invention will become apparent from the following detailed description of the preferred embodiment made with reference to the accompanying drawings.

DETAILED DESCRIPTION OF THE PREFERRED EMBODIMENT

Figure 1:
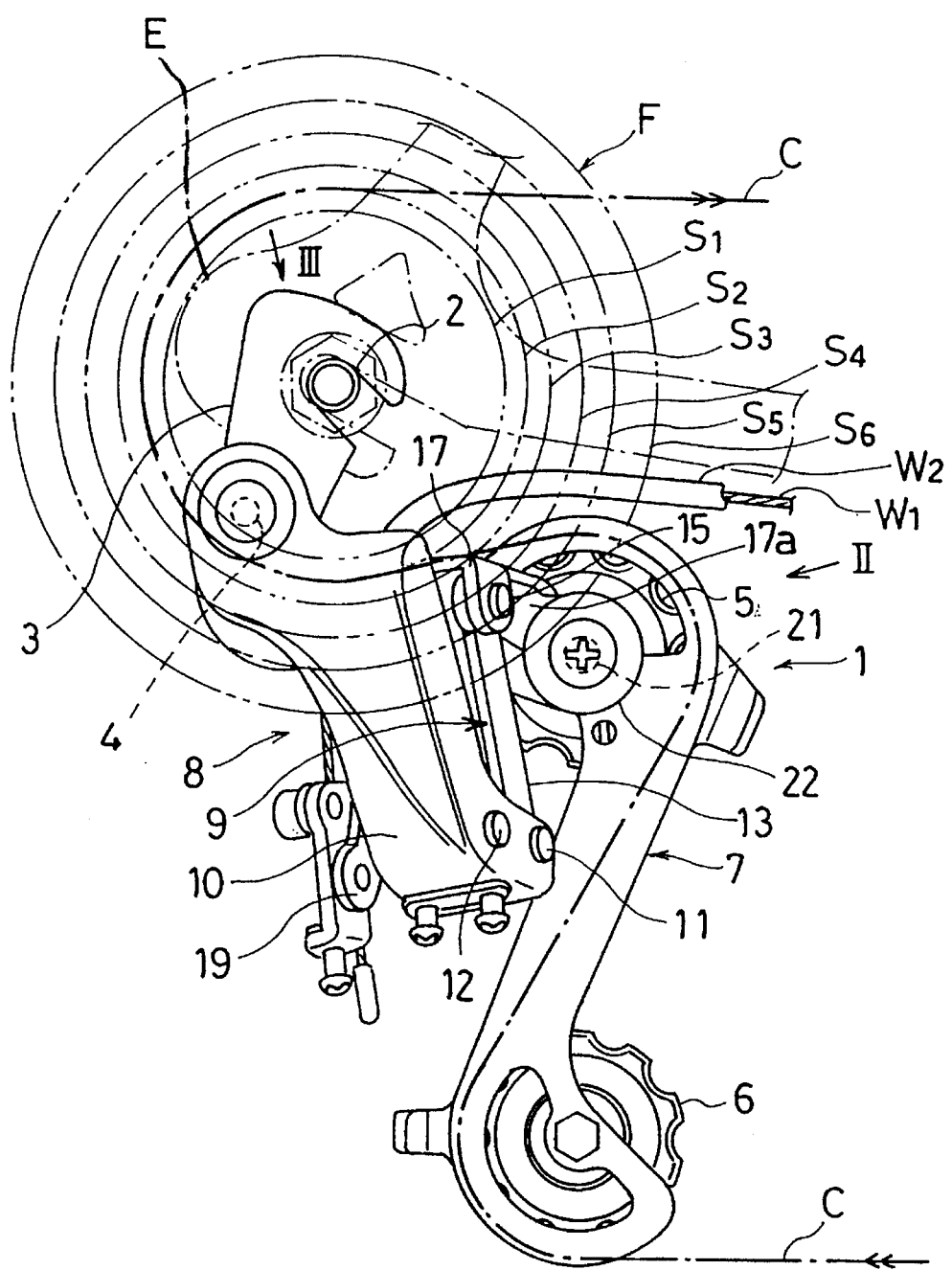
FIG. 1 is a side view showing a bicycle rear derailleur according to a preferred embodiment of the present invention when a chain is held in engagement with a smaller sprocket.
Figure 2:
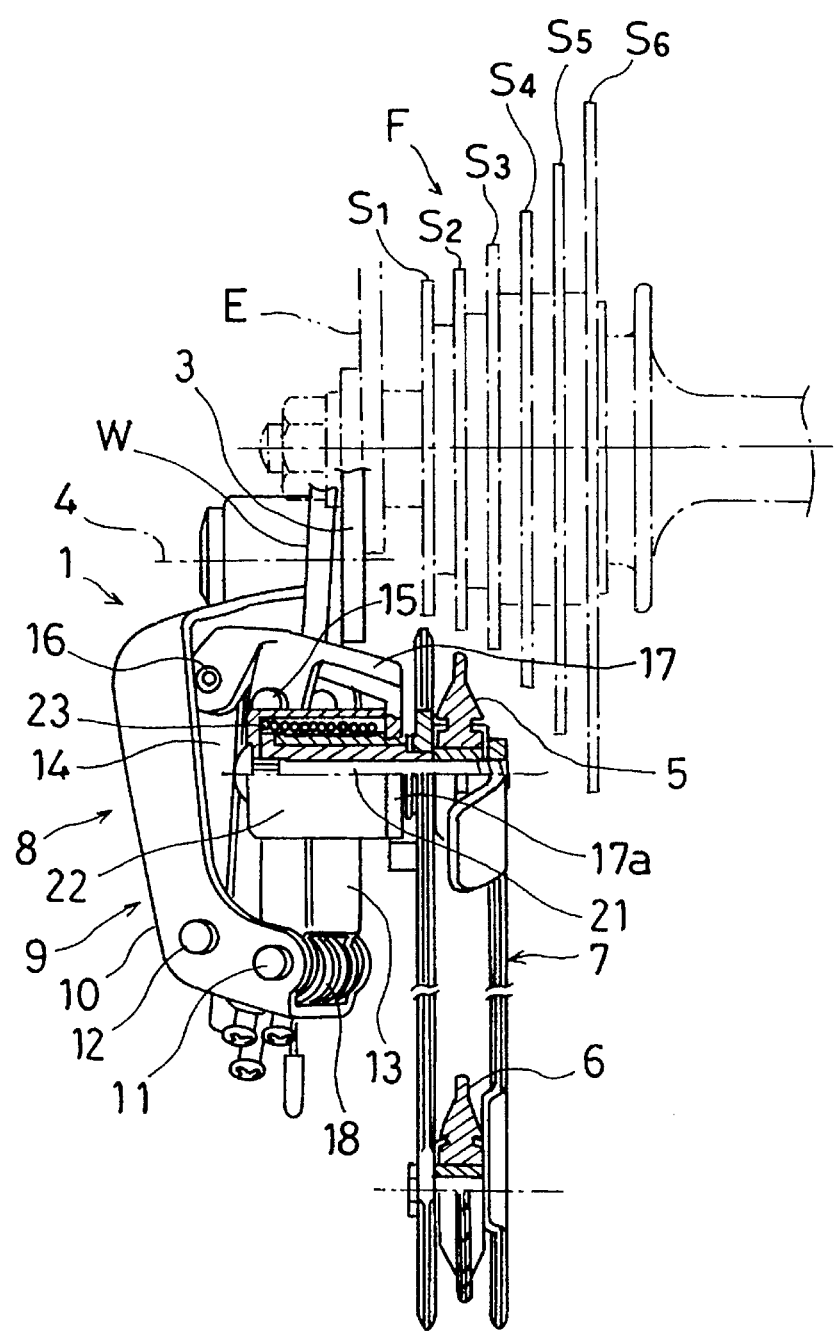
FIG. 2 is a view, partly in section, showing the same derailleur as seen in the direction of an arrow II in FIG. 1.

Referring first to FIGS. 1 and 2 of the accompanying drawings, there is illustrated a bicycle rear derailleur 1 as mounted to a rear fork end (right-side rear fork end) E of a bicycle frame. The fork end E supports a hub shaft 2 which, in turn, rotatably supports a multiple freewheel F. The freewheel F comprises a plurality of sprockets S1–S6 which diametrically increase inward axially of the hub shaft 2. When operated for a speed change, the rear derailleur 1 functions to shift a chain C from one sprocket to another of the freewheel F.

A mount bracket 3 extending rearwardly downward is fixed to the rear fork end E and fixedly carries a first pivot shaft 4 in parallel to the hub shaft 2. The rear derailleur 1 is mounted to the mount bracket 3 for pivotal movement about the first pivot shaft 4. In the illustrated embodiment, the mount bracket 3 is used to support the first pivot shaft 4 in a position slightly below and behind the hub shaft 2. Alternatively, the fork end E itself may have an integral extension extending rearwardly downward to support the first pivot shaft 4 in a similar position.

The rear derailleur 1 comprises a chain guide 7 and a control mechanism 8 for moving the chain guide 7 axially of the hub shaft 2. The chain guide 7 rotatably supports an upper guide wheel (jockey wheel) 5 and a lower tension wheel 6.

According to the illustrated embodiment, the control mechanism 8 comprises a pantograph linkage assembly 9 of the bottom pivotal type. Specifically, the pantograph linkage assembly 9 includes a base member 10 having an upper end pivotally connected to the first pivot shaft 4 and extending downwardly therefrom, upwardly extending inner and outer links 13, 14 having their respective lower ends pivotally connected to the lower end of the base member 10 by respective pins 11, 12, and a movable member 17 pivotally connected to the respective upper ends of the inner and outer links 13, 14 by respective pins 15, 16. The base member 10 is under no spring-bias relative to the first pivot shaft 4, so that the base member 10 is freely pivotable about the first pivot shaft 4.

The pins 11, 12, 15, 16 for connecting the elements 14, 17 are located at the four corners of a parallelogram. Thus, when the pantograph linkage assembly 9 is deformed, the movable member 17 translates axially of the hub shaft 4 (i.e., widthwise of the bicycle) while also moving up and down.

Figure 3:
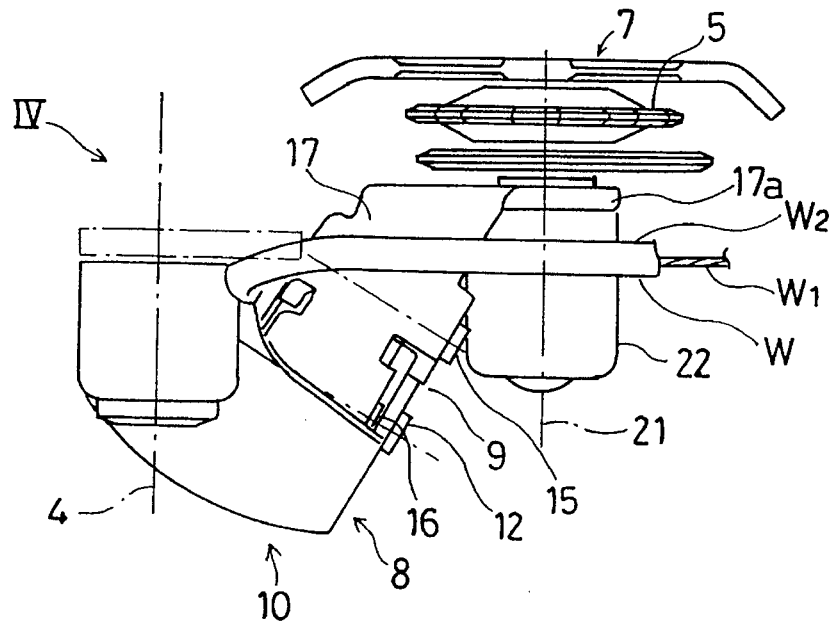
FIG. 3 is a view of the same derailleur as seen in the direction of an arrow III in FIG. 1.

As better shown in FIG. 3, each of the pins 11, 12, 15, 16 is inclined so that its forward end is located laterally outwardly from its rearward end (see also FIG. 2). As a result, when the pantograph linkage assembly 9 is deformed to move the movable member 17 inwardly widthwise of the bicycle, the movable member 7 also translates forwardly downward (see FIG. 5). The inclination angle of the pins 11, 12, 15, 16 may be 30 degrees for example.

As shown in FIG. 2, the inner link 13 is always biased laterally outward by a return spring 18 mounted on the pin 11. Thus, the return spring 18 acts to return the movable member 17 to its laterally outermost position.

A double-type control cable W, which extends along suitable portions (not shown) of the bicycle frame for connection to a shift lever assembly (not shown) at the handlebar or downtube, is connected to the pantograph linkage assembly (see FIG. 1). Specifically, the control cable W includes an inner wire W1 and an outer sheath W2 enclosing the inner wire. As shown in FIG. 2, the base member 10 is provided with a sheath catch 20 for attachment to the outer sheath W2, whereas the inner link 13 is provided with an actuating arm 19 connected to the inner wire W1 extending out of the outer sheath W2.

A relative longitudinal movement between the inner wire W1 and the outer sheath W2 causes a deformation of the pantograph linkage assembly 9 for shifting the chain C (FIG. 1). Specifically, if the inner cable W1 is pulled in the direction of an arrow p, the pantograph linkage assembly 9 is deformed against the return spring 18 so that the movable member 17 translates laterally inward for shifting the chain C from a diametrically smaller sprocket (S2 in FIG. 1 for example) to a diametrically larger sprocket (S6 in FIG. 5 for example). Conversely, when the inner cable W1 is paid out in the direction of an arrow q, the pantograph linkage assembly 9 is deformed by the action of the return spring 18 so that the movable member 17 translates laterally outward for shifting the chain C from a diametrically larger sprocket (e.g. S6 in FIG. 5) to a diametrically smaller sprocket (e.g. S2 in FIG. 1). In either case, the chain guide 7 moves with the movable member 17 axially of the hub shaft 2. It should be appreciated that, due to the upward orientation of the inner and outer links 13, 14, the control cable W need not be curved to a large extent, so that the control cable W can be operated with a high efficiency.

Figure 4:
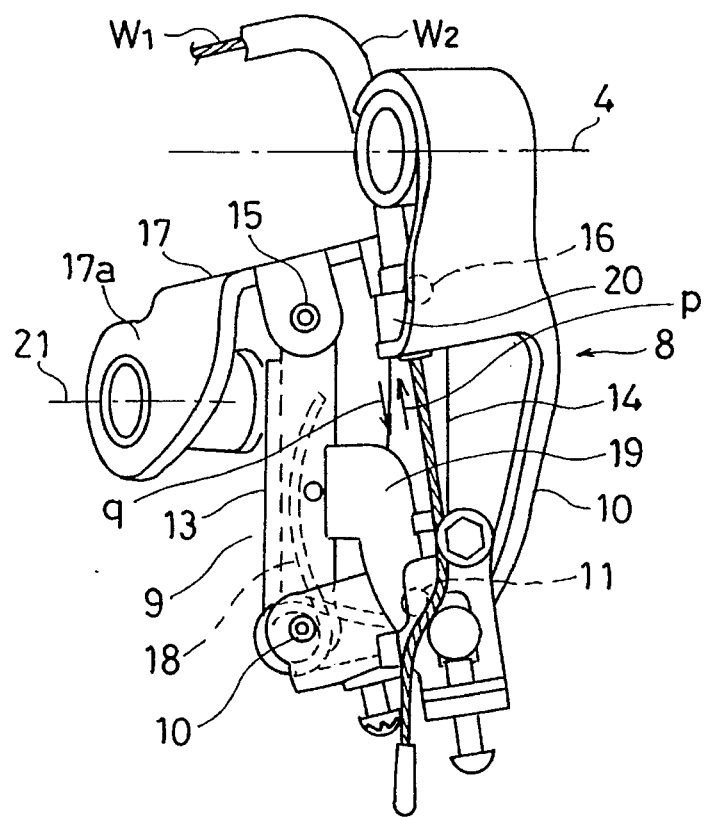
FIG. 4 is a view of the same derailleur as seen in the direction of an arrow IV in FIG. 3.

As shown in FIGS. 2–4, the movable member 17 has an integral forward extension 17a for carrying a second pivot shaft 21 in parallel to the hub shaft 2. The upper end of the chain guide 7 is pivotally connected to the second pivot shaft 21. Further, a coil spring 23 housed in a spring box 22 is fitted around the second pivot shaft 21 to urge the chain guide 7 in a chain tensioning direction which is clockwise in FIG. 1.

According to the illustrated embodiment, the second pivot shaft 21 works also as a support shaft for the guide wheel 5. Thus, the pivotal axis for the chain guide 7 coincides with the rotary axis for the guide wheel 5. The chain guide of this type is called a "pendulum type" chain guide and preferred because the movement path of the guide wheel 5 exactly follows that of the movable member 17 to facilitate designing of the rear derailleur for realizing a desired speed change performance.

Alternatively, the second pivot shaft 21 may be made to pivotally support the chain guide 7 at a portion thereof between the two wheels 5, 6. In this case, the second pivot shaft 21 may be positioned on a line connecting between the two wheels 5, 6 (as in a "linear leverage type chain guide") or offset from such a line (as in a "triangular leverage type chain guide").

The interval between the two wheels 5, 6 of the chain guide 7 may be selected depending on the desired gear capacity of the rear derailleur 1; that is, the range or scope of multiple freewheels to which the derailleur 1 may be applied. In general, a larger interval between the two wheels 5, 6 will provide a greater gear capacity.

Figure 5:
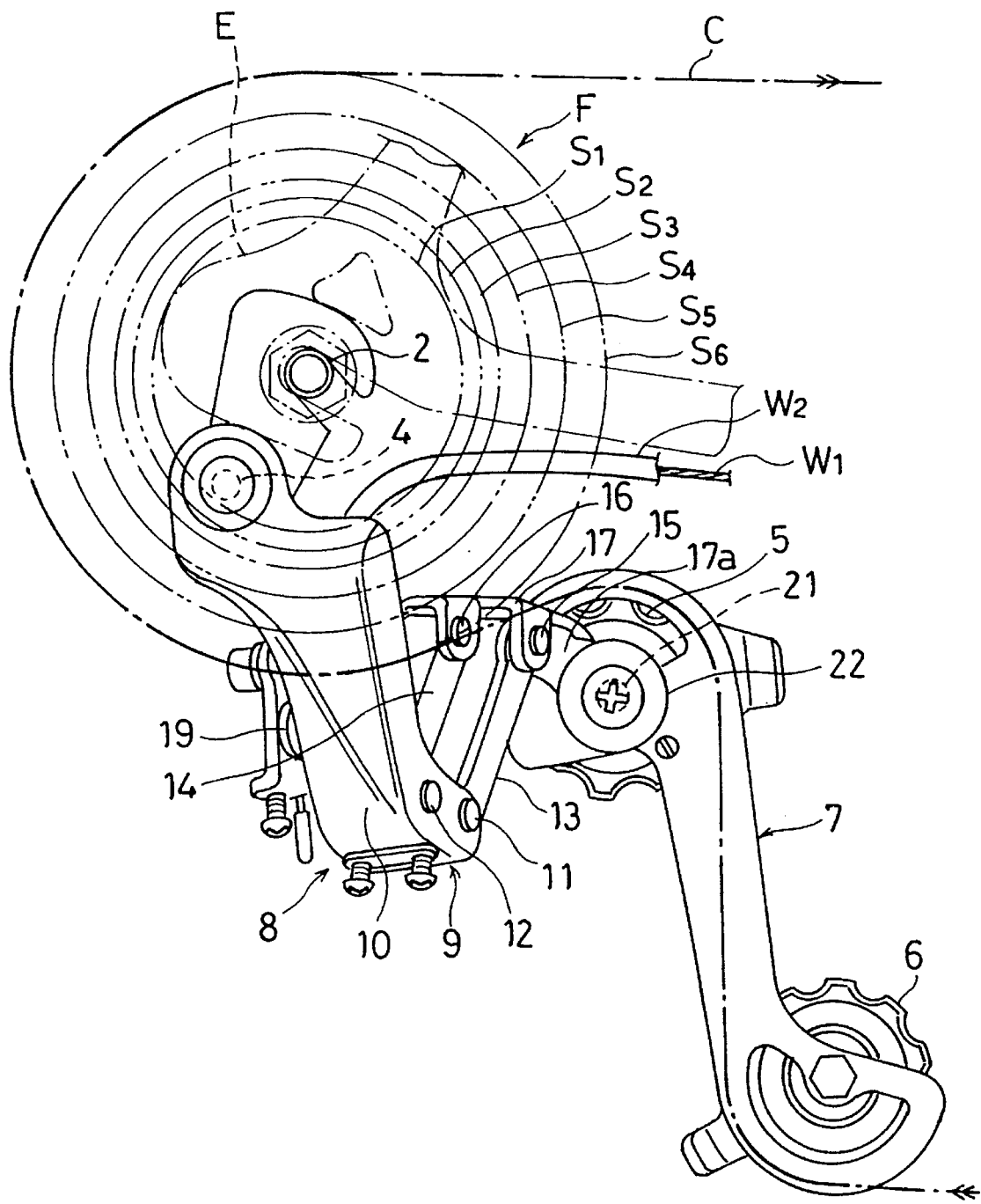
FIG. 5 is a side view similar to FIG. 1 but showing the same derailleur when the chain is held in engagement with a larger sprocket.

As shown in FIGS. 1 and 5, the endless chain C in engagement with an unillutrated chainwheel (front gear) extends rearward for engagement with a rear portion of the tension wheel 6, and then upward for engagement with a front portion of the guide wheel 5 before coming into engagement with a selected sprocket of the freewheel. Thus, the chain C takes a reversed S-form at the chain guide 7.

The bicycle rear derailleur 1 having the above-described structure functions in the following manner.

Since the chain guide 7 pivotally supported on the second pivot shaft 21 is elastically urged rearward (clockwise in FIGS. 1 and 5) by the coil spring 23, the tension wheel 6 applies a tension to the chain C. However, since the length of the chain C is always constant, a portion of the tensioned chain C extending toward the tension pulley 6 generates an upward moment which tends to pivot the entirety of the derailleur 1 upward about the first pivot shaft 4. Due to this upward moment, the guide wheel 5 of the chain guide 7 tends to pivotally move upward about the first pivot shaft 4, thereby acting to wind the chain C around a selected sprocket (e.g. S2 in FIG. 1 or S6 in FIG. 5) which the chain C currently engages.

On the other hand, a portion of the tensioned chain C extending between the guide wheel 5 and the selected sprocket (e.g. S2 in FIG. 1 or S6 in FIG. 5) generates a downward moment which tends to pivot the entirety of the derailleur downward about the first pivot shaft 4. Further, the weight of the derailleur 1 itself also generates a downward moment which tends to pivot the entirety of the derailleur 1 downward about the first pivot shaft 4.

As a result, the guide wheel 5 of the chain guide 7 assumes a position where the downward moment (resulting from the chain tension and the gravity) balances with the upward moment. In such a balancing position, the uppermost edge of the guide wheel 5 is located forwardly from and above the lowermost edge of the selected sprocket (e.g. S2 in FIG. 1 or S6 in FIG. 5), so that the chain C leaving the guide wheel 5 extends rearwardly downward before engaging the selected sprocket.

As previously described, the base member 10 (namely, the rear derailleur 1 as a whole) is freely pivotable about the first pivot shaft 4 without any spring bias. Such free pivotal movement under no spring-bias, of the base member 10 is advantageous at least for the following reasons.

First, whichever sprocket of the freewheel F is selected by the rear derailleur 1 for engagement with the chain C, the free pivotal movement of the derailleur 1 as a whole allows the guide wheel 5 to always assume an optimum position adjacent to and adhead of the selected sprocket. The basic idea underlying here is to let the guide wheel 5 freely move as it needs for assuming the optimum position. If the base member 10 is pivotally biased rearwardly by a spring (as disclosed in U.S. Pat. No. 4,610,644). the spring bias will hinder the free movability which is required for the guide wheel 5 to find out its optimum shifting position.

Secondly, the free pivotal movement of the derailleur 1 as a whole allows the guide wheel 5 to smoothly move radially of the freewheel F at the time of shifting the chain C. Specifically, since the chain C moves not only axially of the freewheel F (namely, axially of the hub shaft 2) but also radially of the freewheel F for disengaging from a current sprocket and engaging a target sprocket, the guide wheel 5 must also move radially of the freewheel F for following such chain movements. The free pivotal movability of the derailleur 1 allows such radial movements of the guide wheel 5. Apparently, a pivotal spring bias for the base member 10 (if applied as in U.S. Pat. No. 4,610,644) will hinder the guide wheel 5 from smoothly moving radially of the freewheel F.

In the third place, since the base member 10 is free from any pivotal spring bias with the chain tension applied solely by the coil spring 23 on the second pivot shaft 21, there is no need for making adjustment between two springs. Thus, the rear derailleur 1 incorporating only the single spring 23 can be rendered applicable to a wide range of freewheels without re-adjustment of spring force.

In the fourth place, since the chain tension is applied solely by the single coil spring 23 on the second pivot shaft 21, the magnitude of the chain tension can be kept relatively small to improve the shiftability of the chain C. If the base member 10 is pivotally biased rearward by a second spring mounted on the first pivot shaft 4 (as disclosed in U.S. Pat. No. 4,610,644), the chain tension will increase due to a distortion of the second spring, consequently hindering smooth shifting of the chain C. Such a disadvantage can be avoided by making the base member 10 freely pivotable about the first pivot shaft 4.

Apparently, all of the advantages described above contribute to improving the chain shifting performance or ability of the rear derailleur 1.

According to the illustrated embodiment, the pantograph linkage assembly 9 of the rear derailleur 1 functions to move the chain guide 7 forwardly downward as it moves inward axially of the hub shaft 2. The pantograph linkage assembly 9 of this type is advantageous at least for the following reasons.

First, the guide wheel 5 of the chain guide 7 can be made to move generally along a common radial line extending from the hub shaft 4 which is located at the center of the freewheel F. Therefore, the guide wheel 5 can take a similar relative position with respect to any sprocket S1–S6 of the freewheel F regardless of the number of sprockets incorporated in the freewheel F. As a result, the rear derailleur 1 can easily adapt to a wide range of freewheels.

Secondly, since the chain guide 7 moves forwardly as it moves laterally toward a diametrically larger sprocket of the freewheel F, the degree of distortion of the coil spring 23 (FIG. 2) can be minimized (see FIGS. 1 and 5) when the chain C is shifted to the diametrically larger sprocket. As a result, an increase of the chain tension is kept as small as possible to improve the chain shifting performance. If the chain guide 7 is made to move rearwardly downward (as disclosed in U.S. Pat. No. 4,610,644), the coil spring 23 must be distorted to a much greater degree than illustrated in FIG. 5 because the chain C has a constant length.

While the present invention is described on the basis of the preferred embodiment, it is obvious that the same is not limited to that specific embodiment. For instance, the present invention is applicable to a rear derailleur of the type disclosed in International Patent Publication No. WO92/10395 (corresponding to U.S. Pat. No. 5,238,258) or No. WO93/18958 wherein a parallelogrammic pantograph linkage assembly is mounted on a chain stay in front of a freewheel for moving a chain guide forwardly downward as the chain guide moves inward axially of a hub shaft. It should be appreciated that the pantograph linkage assembly disclosed in International Patent Publication No. 93/18958 incorporates a base member which is made to pivot forwardly downward about a pivot shaft against a spring bias, but such a spring bias need be omitted according to the present invention.

Further, the present invention is also applicable to a rear derailleur of the type disclosed in U.S. Pat. No. 4,610,644.

In this case, however, a modification need be made to ensure that the guide wheel of the chain guide is always located ahead of the lowermost edge portion of each freewheel sprocket. Examples of modification include pivotally mounting the base member to a forward extension of a rear fork end, elongating the inner and outer links, and mounting the chain guide to a forward extension of the movable member of the pantograph linkage assembly.

Further, the pivoting of the base member 10 (namely, the rear derailleur 1 as a whole) about the first pivot shaft 4 may be limited within a predetermined range. For example, the base member 10 may be prevented from pivoting forwardly upward to a position where the chain guide 7 contacts the chain stay.

Moreover, the base member 10 may be pivotally biased clockwise by a very weak spring mounted on the first pivot shaft 4. The purpose of such a weak spring resides not in positively imparting a chain tension (as disclosed in U.S. Pat. No. 4,610,644) but only in ensuring that the derailleur 1 as a whole is pivotally moved rearward for facilitating chain removal at the time of replacing the rear wheel. Therefore, the spring for pivotally urging the base member 10 may have a much smaller spring constant than the coil spring 23 mounted on the second pivot shaft 21.

The modifications described above are not to be regarded as a departure from the spirit and scope of the present invention, and all such modifications as would be obvious to those skilled in the art are intended to be covered by the appended claims.

I claim:

1. A bicycle rear derailleur for shifting a chain from one sprocket to another of a multiple freewheel which includes a plurality of sprockets, the sprockets diametrically increasing inward axially of a hub shaft, each of the sprockets having a lowermost edge portion, the derailleur comprising:

a control mechanism pivotally mounted to a rear fork end of a bicycle frame by a first pivot shaft which is parallel to the hub shaft; and a chain guide pivotally mounted to the control mechanism by a second pivot shaft which is parallel to the hub shaft, the chain guide rotatably supporting an upper guide wheel and a lower tension wheel, the chain guide being biased in a chain tensioning direction by a spring, the chain guide being controlled by the control mechanism to move axially of the hub shaft, the guide wheel having an uppermost edge portion located ahead of the lowermost edge portion of each sprocket which the chain engages;

the control mechanism being constructed and arranged to move the guide wheel of the chain guide downwardly and forwardly when the guide wheel moves inward axially of the hub shaft;

the control mechanism comprising a pantograph linkage assembly which includes a base member pivotally connected to the first pivot shaft, inner and outer links having respective base ends pivotally connected to the base member by first and second pins, and a movable member pivotally connected to the respective free ends of the inner and outer links by third and fourth pins for carrying the second pivot shaft; the first to fourth pins being located at four corners of a parallelogram, the base member having an upper end pivotally connected to the first pivot shaft and extending downwardly to provide a lower end below the freewheel, the base ends of the inner and outer links being pivotally connected to the lower end of the base member by the first and second pins, the inner and outer links extending upward from the lower end of the base member;

each of the first and fourth pins having a forward end and a rearward end and being inclined so that the forward end is located laterally outwardly from the rearward end.

2. The derailleur according to claim 1, wherein the uppermost edge portion of the guide wheel is located above the lowermost edge portion of said each sprocket which the chain engages.

3. The derailleur according to claim 1, wherein the guide wheel of the chain guide is supported to rotate about the second pivot shaft.

4. The derailleur according to claim 1, wherein the control mechanism includes means for permitting freely pivotable movement about the first pivot shaft at least within a predetermined range.

5. A bicycle rear derailleur for shifting a chain from one sprocket to another of a multiple freewheel which includes a plurality of sprockets, the sprockets diametrically increasing inward axially of a hub shaft, the derailleur comprising:

a pantograph linkage assembly including a base member pivotally connected to a rear fork end of a bicycle frame by a first pivot shaft which is parallel to the hub shaft, inner and outer links having respective base ends pivotally connected to the base member by first and second pins, and a movable member pivotally connected to respective free ends of the inner and outer links by third and fourth pins, the first to fourth pins being located at four corners of a parallelogram; and a chain guide pivotally mounted to the movable member of the pantograph linkage assembly by a second pivot shaft which is parallel to the hub shaft, the chain guide rotatably supporting an upper guide wheel and a lower tension wheel, the chain guide being biased in a chain tensioning direction by a spring;

the base member extending downwardly from the first pivot shaft to provide a lower end below the freewheel, the base ends of the inner and outer links being pivotally connected to the lower end of the base member by the first and second pins, the inner and outer links extending upward from the lower end of the base member;

each of the first to fourth pins having a forward end and a rearward end and being inclined so that the forward end is located laterally outwardly from the rearward end;

the pantograph linkage assembly being constructed and arranged to move the upper guide wheel of the chain guide downwardly and forwardly when the upper guide wheel is moved inward axially of the hub shaft.

6. The derailleur according to claim 5, wherein the guide wheel has an uppermost edge portion located forwardly from and above a lowermost edge portion of each sprocket in engagement with the chain.

7. The derailleur according to claim 6, wherein the first pivot shaft is mounted on the rear fork end of the bicycle frame by a mount bracket extending downwardly from the rear fork end.

8. The derailleur according to claim 5, wherein the guide wheel of the chain guide is supported to rotate about the second pivot shaft.

* * * * *